United States Patent [19]

Linnemeier

[11] Patent Number: 4,869,616
[45] Date of Patent: Sep. 26, 1989

[54] UNIVERSAL JOINT CROSS

[75] Inventor: Elmer H. Linnemeier, Washington Depot, Conn.

[73] Assignee: The Torrington Company, Torrington, Conn.

[21] Appl. No.: 94,046

[22] Filed: Sep. 8, 1987

Related U.S. Application Data

[63] Continuation of Ser. No. 861,750, May 7, 1986, abandoned, which is a continuation of Ser. No. 593,014, Mar. 26, 1984, abandoned.

[51] Int. Cl.$^4$ .................... F16B 11/00; B23K 11/24
[52] U.S. Cl. .................... 403/270; 464/136; 29/505; 219/56; 219/78.01
[58] Field of Search .............. 403/346, 347, 271, 272, 403/341, 270, 265, 23, 400; 464/136, 112; 285/150; 29/445, 505, 149.5 R; 219/56, 78.01

[56] References Cited

U.S. PATENT DOCUMENTS

| | | | |
|---|---|---|---|
| 2,238,779 | 4/1941 | Mosebach | 403/270 |
| 2,388,242 | 11/1945 | Arndt | 403/270 |
| 3,110,166 | 11/1963 | Shutt | 464/136 |
| 3,317,705 | 5/1967 | Inoue | 29/505 |
| 3,923,218 | 12/1975 | Niemann | 403/265 |
| 3,994,515 | 11/1976 | Cotten | 285/150 |
| 4,034,152 | 7/1977 | Warner | 403/270 |
| 4,064,385 | 12/1977 | Gött et al. | 219/56 |
| 4,349,718 | 9/1982 | Carota et al. | 219/78.01 |
| 4,371,358 | 2/1983 | Lawe | 464/136 |
| 4,395,615 | 7/1983 | Tanenbaum | 219/56 X |

FOREIGN PATENT DOCUMENTS

| | | | |
|---|---|---|---|
| 682191 | 11/1952 | United Kingdom | 219/78.01 |
| 1231499 | 5/1971 | United Kingdom | 464/136 |

Primary Examiner—Andrew V. Kundrat
Assistant Examiner—Peter M. Cuomo
Attorney, Agent, or Firm—Frank S. Troidl

[57] ABSTRACT

The universal joint cross consists of two cylindrical hardened and ground pins joined together at their longitudinal centers with their axes in a common plane. The pins are joined together by welding under pressure while controlling the length of the welds from the centers of the pins to provide bearing surfaces on the pins with an undisturbed metallurgical structure.

1 Claim, 2 Drawing Sheets

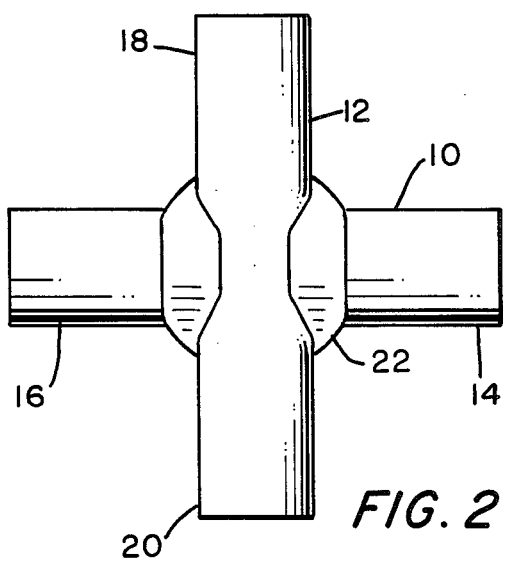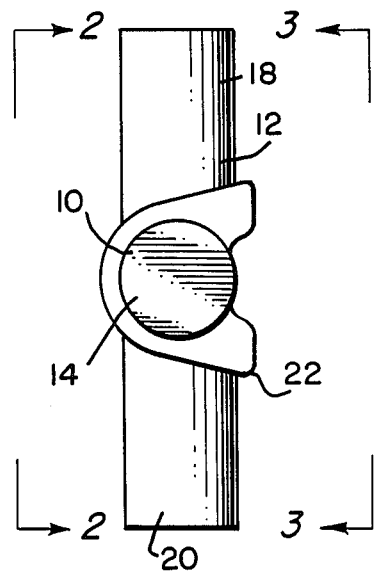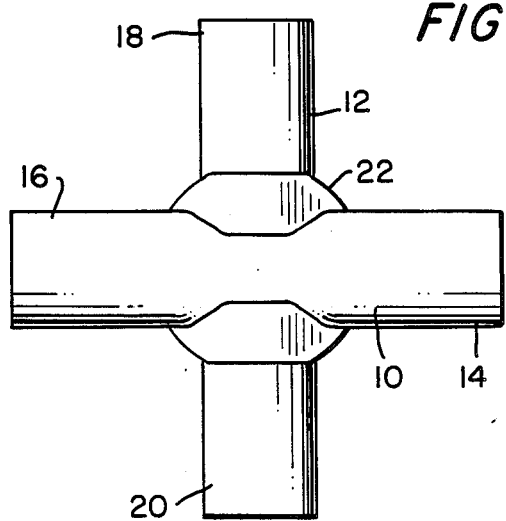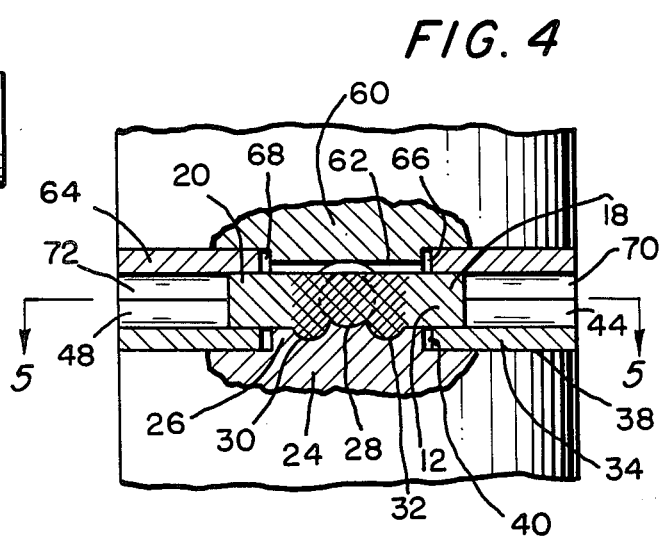

UNIVERSAL JOINT CROSS

This application is a continuation of application Ser. No. 861,750, filed May, 7, 1986, now abandoned which is a continuation of application Ser. No. 593,014, filed Nov. 26, 1984, now abandoned.

This invention relates to universal joints. More particularly this invention is a universal joint cross formed by joining a pair of generally cylindrical pins by the application of heat and pressure.

In the manufacture of universal joints, a common practice is to provide a cross to support the needle bearings that permit the relative rotation of the yokes of the universal joint. It is customary to secure one yoke to opposite pairs of pins on the cross and to secure the other yoke to the remaining pair of pins on the cross.

One currently used method of making universal joint crosses is to produce by forging or casting a cross member and then machining and grinding the ends of the pin shafts to form bearing surfaces for the needle bearings which are placed over the ends of the pins. This raises problems in the machining operations and in maintaining suitable tolerances and efficiencies in the manufacturing process. The result of these disadvantages is a relatively expensive part.

Another currently used method of making universal joint crosses is to precision grind a long pin and two short pins which are then assembled into a center hub. The two small pins usually each have a forked end which encompasses the center of the long pin in assembly. Costly equipment is required to properly form the forked ends of the small pins. Thus the making of universal joint crosses which include a long pin and two short pins is relatively costly.

Still another method of making a universal joint cross is described in U.S. Pat. No. 3,110,166 patented Nov. 12, 1963 by Mr. William N. Shutt and entitled "Universal Joint Spider". In the Shutt patent the universal joint cross is formed by resistance welding under pressure to generally cylindrical members that have been pre-machined. However, the ends of the pins, which are to receive the needle bearings must still be ground and polished after the cross has been formed. This takes additional equipment and fixtures and time which would not be required if the steps in the Shutt process of grinding and polishing the bearing surfaces of the pins after they are welded together were eliminated.

This invention is a new universal joint cross and a new method of making a universal joint cross. The cross is complete and ready for use after the pins have been formed into the cross. There is no need for the final steps of grinding or polishing or any other treatment of the bearing ends of the pins.

Briefly described, the new universal joint cross comprises a first generally cylindrical hardened and ground pin and a second generally cylindrical hardened and ground pin forming bearing pins. The pins are disposed transversely to each other and have their axes in a common plane. The cross is formed by welding the two pins under pressure while controlling the lengths of the welds on the pins to provide bearing surfaces on the ends of the pins with an undisturbed metallurgical structure.

A plastic hub is molded around the welded center of the universal joint cross to create thrust surfaces.

My new method of making a universal joint cross includes the steps of hardening and grinding a pair of pins. The hardened and ground pins are positioned with one pin above the other pin with their axes disposed transversely to each other. The pins are joined at their respective centers by the precise application of heat and pressure while controlling the distance from the centers of the pins. The pins are heated to provide a universal joint cross with a pair of pins disposed transversely to each other with their axes in a common plane and having hardened pin ends.

The invention as well as its many advantages will be further understood from the following detailed description and drawings in which:

FIG. 1 is a side view of a preferred embodiment of cross in accordance with this invention;

FIG. 2 is a front view taken along lines 2—2 of FIG. 1 and in the direction of the arrows;

FIG. 3 is a back view taken along lines 3—3 or FIG. 1 and in the direction of the arrows;

FIG. 4 is a side view of part of a preferred embodiment of die and welding machine assembly used to make the new universal joint cross with parts broken away and in section to illustrate the position of the various parts;

In the various figures like parts are referred to by like numbers.

Figure 5:
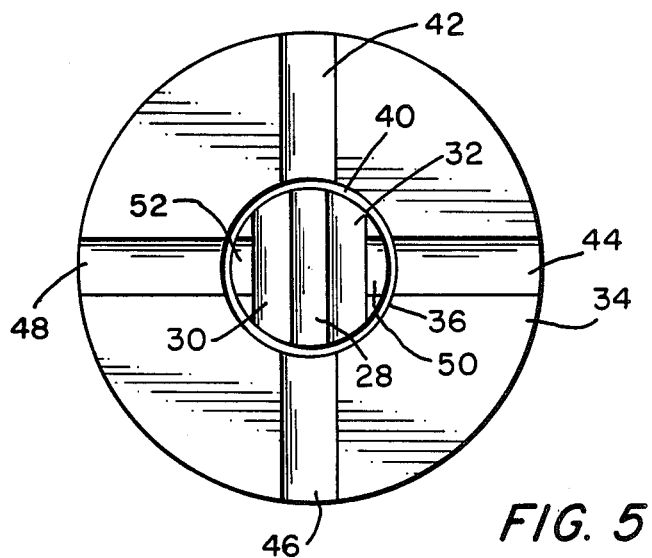
FIG. 5 is a view taken along lines 5—5 of FIG. 4 and in the direction of the arrows.
Figure 6:
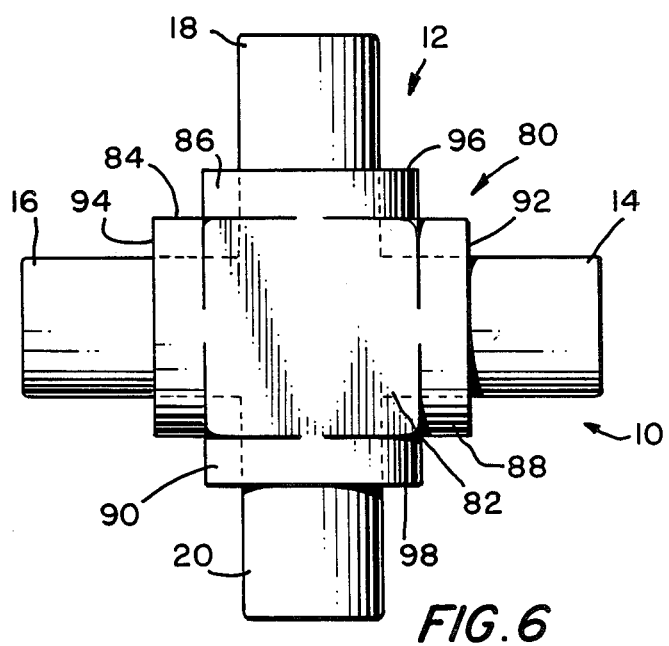
FIG. 6 is a front view of a completed hub and cross assembly.

Referring to the drawings and more particularly to FIGS. 1 through 3 the new universal joint cross has a first generally cylindrical hardened and ground pin 10 and a second generally cylindrical hardened and ground pin 12. These pins are shown after they are joined together into a universal joint cross by the application of controlled amounts of electrical current to join the pins together by controlled heat and high pressure. The ends 14 and 16 of pin 10, and the ends 18 and 20 of pin 12 serve as bearing surfaces for the annulus of needles in needle bearings, not shown, which are commonly placed over the ends of the pins 10 and 12. The enlargement 22 is formed during the welding operation and represents material that is displaced during the welding operation.

In forming the new universal joint cross the pins 10 and 12 are first hardened and ground. Before being joined together to form the cross, the pins 10 and 12 have the same diameter throughout their length. It has been found that if the center areas are reduced the resulting cross is too weak to be useful in high load applications.

The pins are positioned with one pin above the other pin with their axes disposed transversely to each other. The pins are joined at their respective centers by the precise application of heat and pressure while controlling the distance from the centers of the pins the pins are heated. The resulting universal joint cross then has the shape shown in FIGS. 1 through 3.

FIG. 4 and FIG. 5 show a portion of the die or fixture used to perform the welding operation. The die includes a bottom assembly having a copper electrode 24 with a pedestal 26. The pedestal 26 includes a central groove 28 for supporting one of the pins. The semi-circular grooves 30 and 32 adjacent each side of the pin supporting groove 28 are provided in the copper pedestal 26 to provide a place for the molded metal to go before the metal solidifies into the enlargement 22 of FIGS. 1 through 3.

An annular steel disk 34 (see FIG. 5) having a central bore 36 rests on the annular shoulder 38 of the copper electrode 24. The pedestal 26 of the electrode 24 extends partially through the bore 36 of annular disk 34. The diameter of the bore 36 is greater than the diameter of the pedestal 26 thus providing an annular space 40.

Four perpendicular semi-circular grooves 42, 44, 46, and 48 (see FIG. 5) extend from the bore 36 of annular disk 34 to the perimeter of the annular disk 34. Semi-circular grooves 42 and 46 are in line with the pin supporting groove 28 of the pedestal 26; semi-circular grooves 44 and 48 are perpendicular to the pin supporting groove 28. The copper electrode pedestal 26 is also provided with a short semicircular groove 50 in line with groove 44 of the annular disk 34 and a short semi-circular groove 52 in line with groove 48 on the annular disk 34.

The top assembly of the die or fixture used to weld the pins together to form the universal joint cross, as seen in FIG. 4 includes a top copper electrode 60 with a centrally located pedestal 62. A steel annular disk 64 with a central bore 66 fits over the copper pedestal 62. The diameter of the bore 66 is larger than the diameter of the pedestal 62 thus providing an annular space 68. Semi-circular grooves 70 and 72 on annular disk 64 register with semi-circular grooves 44 and 48, respectively, on annular disk 34. Annular disk 64 is provided with additional grooves (not shown) which register with the grooves 42 and 46 (see FIG. 5) on the annular disk 34.

The pedestal 62 of upper copper electrode 60 is also provided with a curved pin support, and two adjacent semi-circular grooves all of which extend perpendicularly to the pin support 28 and two adjacent grooves 30 and 32 on pedestal 26 of the lower copper electrode 24. In addition, the upper copper electrode pedestal 62 is provided with short semi-circular grooves (not shown) which are in line with semi-circular- grooves (not shown) extending from the bore 66 of the upper annular steel disk 64 to the outer perimeter of the upper annular steel disk 64 and are registered with the annular grooves 42 and 46 of the lower annular disk 34.

To practice my new method of making a universal joint cross, a pair of pins like pins 10 and 12 are hardened and ground. One pin is placed on the groove 28 of the pedestal 26 of the lower copper electrode 24. The other pin is positioned in the center perpendicular groove (not shown) on the pedestal 62 of the upper copper electrodes 60 with the two pins positioned with their axes disposed transversely to each other.

Referring to FIG. 4 note that the pin 12 is positioned so that the hardened and ground pin ends 18 and 20 extend beyond the outer periphery of the pedestals 26 and 62 and into the grooves of the annular disks 38 and 64. Similarly, the hardened and ground ends 14 and 16 of pin 10 extend beyond the outer periphery of the pedestals 26 and 62 and into grooves of the annular disks 38 and 64. The upper and lower assemblies are then pushed together so that the pins are joined at their respective centers by the precise application of heat and pressure. The heat is applied by periodically pulsing direct current pulses across the upper and lower copper electrodes.

The proper control of the electrical pulses across the electrodes and the locating of the pins so that the hardened pin ends extend into the grooves contained in annular disks 38 and 64 permits one to control the length of the weld from the center. The lengths of the pins 10 and 12 which is heated is controlled so that only the central portion of the material on the pins is melted to provide the enlargement 22. The intensity and duration of the electrical pulses and the location of the pins is such that the hardened pin ends, 18 and 20 on pin 12, and 14 and 16 on pin 10 are not heated during the operation. Thus the portions 18 and 20 on pin 12 and 14 and 16 on pin 10 remain hardened so that the metallurgical structure of the hardened and ground pins at those points are not disturbed. This is very important because the hardened pin ends are the parts which support the needle bearings.

After the universal joint cross has been completed a jacket or hub of plastic 80 is molded around the welded center of the universal joint cross to create thrust surfaces for the needle bearings which are to be placed over the ends 14 and 16 of pin 10 and the ends 18 and 20 of pin 12. The plastic hub 80 is generally in the shape of a cubic center portion 82 having the annular protuberances 84, 86, 88, and 90 extending from the four sides of the center cubular portion 82 through which pins 10 and 12 extend. Annular protuberances 88 and 84 extend longitudinally partially along the pin 10. Annular protuberances 86 and 90 extend partially along pin 12. The extension of each of the annular protuberances 84, 86, 88 and 90 is such that the welded center portion of the universal joint cross is covered by the plastic hub 80 leaving exposed the hardened pin ends 14, 16, 18, and 20. The needle bearings (not shown which are placed over the hardened ends of the pins 10 and 12 thus have the needle rollers in the needle roller bearings in contact with the hardened portions 14, 16, 18 and 20. Contact of needle rollers with hardened portions is necessary for the proper operation of the universal joint.

The annular extreme ends 92 and 94 of annular protrusions 88 and 84, respectively, are perpendicular to the axis of the pin 10 and thus provide thrust surfaces for the needle roller bearings (not shown) which are later placed on the ends 14 and 16 of pin 10. The annular extreme ends 96 and 98 of annular protrusions 86 and 90, respectively, of the hub 80 extend perpendicularly to the axis of pin 12 and serve as thrust surfaces for the needle roller bearings (not shown) which are to be placed over the hardened ends 18 and 20 of pin 12.

I claim:

1. A method of making a universal joint cross comprising the steps of: hardening and grinding a pair of metal pins; positioning one pin on a first electrode having an outer periphery with the hardened and ground pin ends extending beyond the outer periphery of the first electrode and into support means separate from the first electrode; positioning the second pin in a second electrode having an outer periphery with the hardened and ground pin ends extending beyond the outer periphery of the second electrode and into support means separate from the second electrode and with the pin axes disposed transversely to each other; pushing the electrodes and support means together and periodically applying direct current pulses across the electrodes, at a controlled pulse intensity and controlled pulse duration to control the lengths of the pins from their longitudinal centers which are heated to cause only the longitudinal central portion of the metal on the pins to melt to join the pins leaving the pin ends hardened and ground.

* * * * *